United States Patent
Atwater et al.

(10) Patent No.: US 8,900,752 B2
(45) Date of Patent: Dec. 2, 2014

(54) LEAD MANGANESE-BASED CATHODE MATERIAL FOR LITHIUM ELECTROCHEMICAL SYSTEMS

(75) Inventors: Terrill B. Atwater, Bel Air, MD (US); Arek Suszko, Albuquerque, NM (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 226 days.

(21) Appl. No.: 13/276,939

(22) Filed: Oct. 19, 2011

(65) Prior Publication Data

US 2013/0101898 A1  Apr. 25, 2013

(51) Int. Cl.
| | | |
|---|---|---|
| H01M 4/50 | (2010.01) | |
| H01M 4/56 | (2006.01) | |
| C01G 45/12 | (2006.01) | |
| H01M 4/131 | (2010.01) | |
| H01M 4/1391 | (2010.01) | |
| H01M 4/505 | (2010.01) | |
| H01M 4/62 | (2006.01) | |

(52) U.S. Cl.
CPC ............ *H01M 4/131* (2013.01); *H01M 4/1391* (2013.01); *H01M 4/505* (2013.01); *H01M 4/625* (2013.01); *H01M 4/622* (2013.01); *H01M 4/623* (2013.01); *Y02E 60/122* (2013.01)
USPC ............................ 429/224; 429/225; 423/599

(58) Field of Classification Search
CPC combination set(s) only.
See application file for complete search history.

(56) References Cited

U.S. PATENT DOCUMENTS 5,135,732 A * 8/1992 Barboux et al. .............. 423/599
5,753,202 A    5/1998 Wang et al.

FOREIGN PATENT DOCUMENTS

FR        2380224 A1 * 10/1973

OTHER PUBLICATIONS

H. Kim, Synthesis and characterization of MnO2-based mixed oxides as supercapacitors, Jan. 28, 2003, J. Electrochem. Soc, 150, D56-D62.*

T. Yang, Nafion/lead oxide—manganese oxide combined catalyst for use as a highly efficient alkaline air electrode in zinc-air battery, Apr. 29, 2011, Electrochimica Acta, 56, 6205-6210.*

* cited by examiner

*Primary Examiner* — Ula C. Ruddock
*Assistant Examiner* — Daniel Gatewood
(74) *Attorney, Agent, or Firm* — Azza Jayaprakash (57) ABSTRACT

A lead manganese-based cathode material is provided. Furthermore, a lithium or lithium ion rechargeable electrochemical cell is provided incorporating lead manganese-based cathode material in a positive electrode. In addition, a process for preparing a stable lead manganese-based cathode material is provided.

5 Claims, 8 Drawing Sheets

LEAD MANGANESE-BASED CATHODE MATERIAL FOR LITHIUM ELECTROCHEMICAL SYSTEMS

GOVERNMENT INTEREST

The invention described herein may be manufactured, used, imported, sold, and licensed by or for the Government of the United States of America without the payment of any royalty thereon or therefor.

FIELD OF THE INVENTION

The present disclosure relates generally to the field of electrochemical power sources and, more particularly, to rechargeable lithium batteries and rechargeable lithium-ion batteries using a lead manganese-based material as a positive electrode.

BACKGROUND OF THE INVENTION

Perhaps the most popular battery chemistries that have hit the consumer market recently are lithium-based systems. Lithium batteries use high valence metal oxide materials, which are reduced during the electrochemical reaction. This reaction in rechargeable lithium and rechargeable lithium ion batteries must be fully reversible in order to have a commercially viable cell. These electrochemical systems include manganese-based lithium metal oxides configured in lithium, lithium ion, and lithium polymer electrochemical cells. Common reversible metal oxide materials used in lithium batteries include $Li_xMn_2O_4$, $Li_xMnO_2$, $Li_xCoO_2$, $Li_xNiO_2$, and $Li_xNi_y\text{-}Co_zO_2$.

Today, rechargeable lithium batteries are used in portable electronic devices including cellular phones and laptop computers. Future use of rechargeable lithium battery systems is targeted at applications related to electronic vehicles and pairing with fuel cells to produce high-energy systems with excellent pulse capabilities. Lithium batteries have the flexibility of being packaged into either cylindrical or prismatic cell designs; this feature makes them applicable to almost any portable electronic system where battery volume is a concern.

The benefits of lithium battery systems include high specific energy (Wh/kg) and high energy density (Wh/l). Lithium electrochemical systems produce a relatively high nominal voltage between 3.0 and 4.75 volts. Lithium electrochemical systems can operate between 3.0 and 4.35 volts or between 2.0 and 3.5 volts. Additionally, lithium electrochemical systems have excellent charge retention due to a low self-discharge rate.

Manganese dioxide ($MnO_2$) based materials are attractive for use as cathode material in lithium electrochemical systems. $MnO_2$ is attractive because of its high energy density and low material cost. $MnO_2$ is an active material which creates a skeletal structure that allows lithium cations to fill vacancies and voids within the structure. Ideally, this structure does not change with cycling; altering of this crystal structure may cause capacity fading. Additionally, the $MnO_2$ active material exists in different forms. These forms include a lithiated spinel ($Li_xMn_2O_4$) and its different structures denoted by α, β, γ, and λ. In lithium electrochemical cells, the active material is bound to an aluminum current collector with either Teflon or pVdF mixed with conductive carbon. The conductive carbon serves as an aid for electron transfer.

Capacity fading is a major problem for rechargeable lithium cells. Capacity fading is the loss of cycle capacity in a cell over the life of an electrochemical system, limiting the practical number of cycles that may be used. In lithium battery systems, capacity fading is often attributed to the degradation of the active cathode material. This cyclic capacity loss is a result of both changes in composition and crystal structure of the active cathode material. Additionally, throughout the life of a cell, parasitic side reactions occur between chemical species of all cell components. Methods of reducing this effect include modifying the crystal structure and/or composition of the active material.

Capacity fading associated with the cathode material has also been linked to the fracture of active material and the dissociation or disconnection of the fractured active material from the electrode. Fractures are caused by mechanical stress-strain of $MnO_2$ crystal structures during cycling of the cell. Stress-strain forces act on the crystal structures as a result of repeated phase transitions. These stress-strain forces are due to the insertion and extraction of lithium in the cathode lattice. This frequent conversion in geometry and dimension of the crystal lattice creates a significant mechanical strain on the cathode. This mechanical strain is believed to electrically disconnect active material from the electrode through fracture. Additional external forces including elevated temperatures also promote cathode fracture; and structural vibrations increase with temperature, resulting in the disconnection of the fractured active material from the electrode.

Another major cause of capacity fading in manganese-based cathodes is the dissolution of manganese into the electrolyte. Through a series of chemical reactions, manganese ($Mn^{2+}$) is removed from the cathode and dissolved into the electrolyte, resulting in a decrease of active material in the cathode. Manganese dissolution is linked to reactions with the electrolyte and, more importantly, the impurities dissolved within the electrolyte. Many of these reactions are linked to the water content of the electrolyte and the presence of hydrofluoric acid (HF). The products of parasitic reactions are phase transitions of the $MnO_2$ structure, which result in the formation of $Mn_2O_3$ and $Mn_3O_4$.

Manganese dioxide ($MnO_2$) provides a skeletal background for lithium intercalation during cycling of a lithium electrochemical cell. When fully charged, manganese particles have a meta-stable 4+ valence state. This meta-stable 4+ valence state allows for the attraction and intercalation of lithium cations into the lattice structure. As lithium cations fill the skeleton crystal structure during discharge, the crystal structure of the active material changes. Charging of the cell removes these lithium cations from the cathode, again altering the crystal structure. Ideally, this is a completely efficient and reversible process, but realistically, continuous crystal structure changes lead to phase transitions that can create problems. As a result of these phase changes, unwanted crystal structures develop that are either too stable for electrochemical reactions or block the insertion/extraction paths of lithium cations into the cathode material. This general phenomenon is regarded as the major contributor to capacity fading.

$MnO_2$ exists in several phases or crystal structures and are referred to by the following prefixes: α, β, γ, and λ. α-$MnO_2$ is the most stable $MnO_2$ structure. α-$MnO_2$ is one-dimensional and the lattice contains both one by one and two by two channels for lithium insertion/extraction. β-$MnO_2$ is a tetragonal structure with the lattice containing one by one channels for lithium insertion/extraction. γ-$MnO_2$ is also one-dimensional, existing in both hexagonal or orthorhombic crystal structures with a lattice that contains one by two channels for lithium insertion/extraction. Because of their stability α-$MnO_2$, β-$MnO_2$, and γ-$MnO_2$ are not considered rechargeable. However, cycling of lithium into the $\alpha\text{-MnO}_2$, $\beta\text{-MnO}_2$, and $\gamma\text{-MnO}_2$ lattice can be achieved with rigid stoichiometric control.

$\lambda\text{-MnO}_2$ is considered the preferred $\text{MnO}_2$ based cathode material for rechargeable lithium electrochemical systems. $\lambda\text{-MnO}_2$ is created through the delithiation of $\text{Li}_x\text{Mn}_2\text{O}_4\text{AB}_2\text{O}_4$ spinel. The $\lambda\text{-MnO}_2$ crystal structure is maintained through both charge and discharge of the $\text{LiMn}_2\text{O}_4$ spinel. The maintenance of the $\lambda\text{-MnO}_2$ structure during insertion and extraction of lithium in the $\text{Li}_x\text{Mn}_2\text{O}_4$ spinel makes it an attractive couple with lithium for rechargeable electrochemical systems. The $\lambda\text{-MnO}_2$ crystal structure is a three dimensional cubic array. This crystal structure promotes mechanical stability and adequate pathways for lithium insertion/extraction. Degradation of the $\lambda\text{-MnO}_2$ crystal structure forming $\alpha$, $\beta$ or $\gamma\text{-MnO}_2$ crystals and other $\text{MnO}_x\text{O}_y$ phases, reduces the capacity of the cathode material.

As lithium intercalates, the size and orientation of the crystal structures change. In $\text{Li}_x\text{Mn}_2\text{O}_4$ spinel materials, when $0.05<x<1$, the crystal structure is cubic ($\lambda\text{-MnO}_2$). When $1<x<1.8$, the structure of $\text{Li}_x\text{Mn}_2\text{O}_4$ (no longer a $\text{AB}_2\text{O}_4$ spinel) is tetragonal. Additionally, when $x<0.05$, phase transition to the more stable $\alpha$, $\beta$ and $\gamma$ $\text{MnO}_2$ can occur. Continued charge and discharge promotes the transformation of the cubic crystal structure to other cubic, tetragonal, and monoclinic phases. Tetragonal and monoclinic crystal structures may become inactive leading to the loss of active cathode material. Voltage control, maintaining $0.05<x<1$, allows for the mitigation of the formation of unwanted crystal structures.

When the potential of the lithium/$\text{Li}_x\text{Mn}_2\text{O}_4$ electrochemical system is maintained between 3.0 and 4.25 volts, the cubic phase is maintained. When the potential of the system drops below 3.0 volts, the $\text{Li}_x\text{Mn}_2\text{O}_4$ cathode material undergoes a phase change from cubic to tetragonal. When the potential of the system increases above 4.25 volts, the $\text{Li}_x\text{Mn}_2\text{O}_4$ cathode material becomes stripped of the lithium component and undergoes a phase change from cubic ($\lambda\text{-MnO}_2$) to the more stable $\alpha$, $\beta$ and/or $\gamma$ $\text{MnO}_2$.

Other phase transitions that lead to capacity fading include the formation of $\text{Mn}_2\text{O}_3$ and $\text{Mn}_3\text{O}_4$. The $\text{Mn}_2\text{O}_3$ and $\text{Mn}_3\text{O}_4$ formations result from the liberation of oxygen in the $\text{MnO}_2$ and $\text{Mn}_2\text{O}_4$ structures. The valence state of manganese in these structures is 3+ or less. This lower valence state creates a stable crystal structure that is not conducive to lithium intercalation and, therefore, not rechargeable. As more $\text{Mn}_2\text{O}_3$ and $\text{Mn}_3\text{O}_4$ are formed, less $\text{MnO}_2$ and $\text{Mn}_2\text{O}_4$ remain and the usefulness of the cathode decreases.

Thus, conventional lithium/$\text{Li}_x\text{Mn}_2\text{O}_4$ electrochemical systems remain reversible against lithium, when x is maintained between 0.10 and 0.85 for $\text{Li}_x\text{Mn}_2\text{O}_4$, between 0.1 and 0.5 for $\text{Li}_x\text{MnO}_2$, and between 0.4 and 0.95 for $\text{Li}_x\text{CoO}_2$, $\text{Li}_x\text{NiO}_2$ and $\text{Li}_x\text{Ni}_y\text{Co}_z\text{O}_2$. However, if the stoichiometry exceeds the aforementioned limitations, the lithium manganese-based $\text{AB}_2\text{O}_4$ cathode material undergoes a phase change and is no longer reversible. Consequently, the cell will no longer accept a charge rendering the cell inoperable. In order to maintain the stoichiometry of conventional lithium/$\text{Li}_x\text{Mn}_2\text{O}_4$ electrochemical systems within the aforementioned limitations, rigid electronic control is employed. Accordingly, there has been a long-felt need for a lithium manganese-based $\text{AB}_2\text{O}_4$ cathode material that resolves problems associated with loss of reversibility in lithium batteries without the need for rigid stoichiometry electronic control. This problem presents a major obstacle for rechargeable lithium battery technology.

Other disadvantages of conventional lithium manganese-based $\text{AB}_2\text{O}_4$ spinel materials include the limited cycle life for lithium electrochemical systems. An additional limiting factor for lithium manganese-based $\text{AB}_2\text{O}_4$ spinel materials is the time required to process the raw materials and synthesize the desired product. Conventional methods require multiple mixing, grinding and calcining steps, which take a time period of days to complete.

SUMMARY OF THE INVENTION

The present disclosure resolves the aforementioned problems associated with conventional $\alpha\text{-MnO}_2$, $\beta\text{-MnO}_2$, $\gamma\text{-MnO}_2$ and lithium manganese-based $\text{AB}_2\text{O}_4$ spinel cathode materials in lithium electrochemical systems and rechargeable lithium electrochemical systems. The present disclosure provides a lead manganese-based cathode material with improved performance over conventional $\alpha\text{-MnO}_2$, $\beta\text{-MnO}_2$, $\gamma\text{-MnO}_2$ and $\text{LiMn}_2\text{O}_4$ lithium battery cathode material. The present lead manganese-based cathode material provides high mechanical stability and lack of capacity fading, thus preventing phase changes during charge and discharge cycles and retaining reversibility.

Furthermore, the present disclosure provides a method of preparing the aforementioned lead manganese-based cathode material via a solid state reaction between a lead compound and a manganese compound yielding the present $\text{Pb}_x\text{MnO}_y$ compound. While conventional preparation methods take 48 to 72 hours, the preparation method according to the present disclosure takes approximately 24 hours.

According to an exemplary embodiment of the present disclosure, a stable lead manganese-based cathode material is provided having the general formula $\text{Pb}_x\text{MnO}_y$, where x ranges from 0.05 to 0.5 and y ranges from 1.95 to 2.25. In the $\text{Li}/\text{Pb}_x\text{MnO}_y$ electrochemical system, lithium metal or ion and $\text{Pb}_x\text{MnO}_y$ react to form $\text{Li}_z\text{Pb}_x\text{MnO}_y$, where z ranges from 0 to 1.0. During this reaction, the $\text{Li}_z\text{Pb}_x\text{MnO}_y$ material remains mechanically stable. Thus, charge discharge protection is not required due to the stability of the $\text{Li}_z\text{Pb}_x\text{MnO}_y$ material as z goes from 0.0 to 1.0 and back to 0.0 during use and recharge.

In one embodiment, a method of preparing a lead manganese-based cathode material includes mixing a lead compound and a manganese compound to produce a homogenous mixture; annealing the homogenous mixture for a time period ranging from 16 to 24 hours at a temperature ranging from 400° C. to 500° C.; and mixing the resulting $\text{Pb}_x\text{MnO}_y$ material with a conductive carbon and a binder to fabricate a battery cathode material.

Another embodiment of the present disclosure is a lead manganese-based cathode material prepared using the aforementioned process. In yet another embodiment of the present disclosure, a lithium electrochemical cell includes a lithium metal or lithium ion anode, an organic electrolyte, and a cathode containing the present lead manganese-based cathode material.

BRIEF DESCRIPTION OF THE DRAWINGS

The accompanying drawings, which are included to provide further understanding of the present disclosure, and are incorporated in and constitute a part of the specification, illustrate preferred embodiments of the present disclosure, and together with the description serve to explain the principles of the present disclosure. The present disclosure will now be described further with reference to the accompanying drawings as follows.

DETAILED DESCRIPTION

Figure 1:
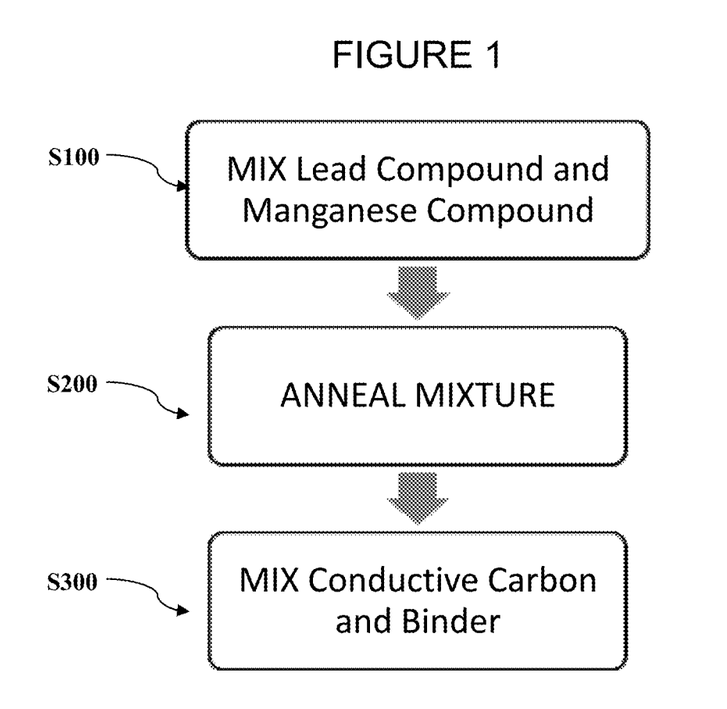
FIG. 1 is a flowchart illustrating exemplary steps for fabricating a $Pb_xMnO_y$ material according to the present disclosure.

FIG. 1 is a flowchart illustrating process steps in an exemplary embodiment of the present disclosure. More specifically, FIG. 1 shows exemplary steps according to the present disclosure for the preparation of $Pb_xMnO_y$-based cathode material via a solid state reaction. In step S100, a lead compound is mixed with a manganese compound using a mortar and pestle. Alternative mixing methods include ball milling and high amplitude vibration milling. The stoichiometric ratio of lead to manganese oxide ($Pb:MnO_2$) in the mixture of starting materials ranges from 0.05 to 0.50, from 0.15 to 0.4, or 0.2 to 0.3. Suitable lead compounds include lead metal, lead oxides, lead hydroxides, lead carbonate, and lead acetate. Suitable manganese compounds include, but are not limited to, electrolytic $MnO_2$ (EMD), chemically prepared $MnO_2$ (CMD), $Mn_2O_3$, $Mn_3O_4$, manganese nitrate, manganese carbonate, manganese hydroxide, and manganese acetate.

In Step S200, the mixture is transferred to an alumina crucible and reacted by heating in an annealing oven maintained with atmospheric air. The material was heated to 270° C., 350° C., 400° C. and 500° C. for 24 hrs. The annealing temperature ranges from 350° C. to 550° C., from 400° C. to 500° C., or from 400° C. to 450° C. In Step S300, the annealed mixture is mixed with a conductive carbon material and a binder (which are discussed below in further detail) using a mortar and pestle. Other suitable mixing methods include ball milling.

Figure 2:
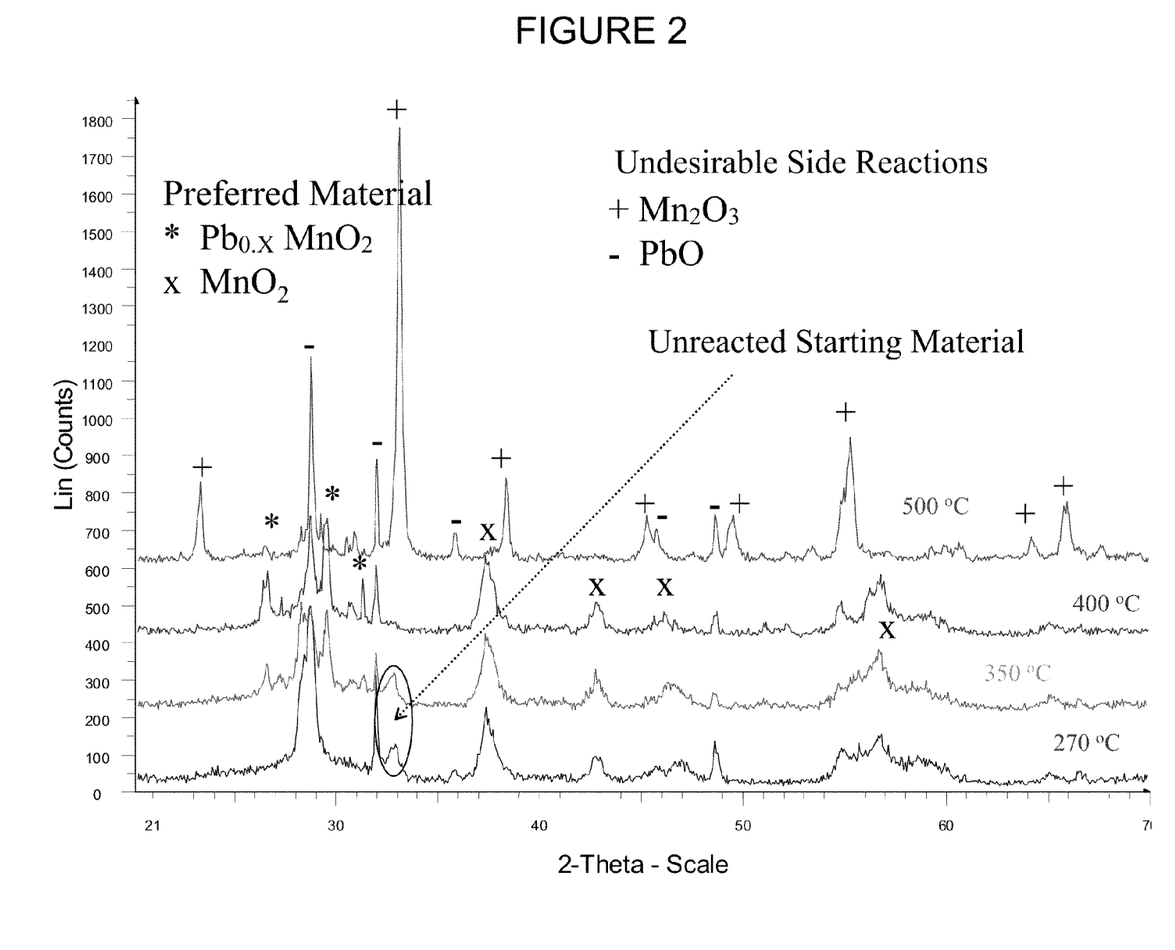
FIG. 2 is a graph showing powder X-ray diffraction spectra for $Pb_xMnO_y$ materials according to the present disclosure.

Differential scanning calorimetery (DSC) and powder X-ray diffraction were used to identify the reactive environment for the mixture and to "fingerprint" the materials, respectively. FIG. 2 shows powder X-ray diffraction patterns for fabricated $Pb_xMnO_y$ materials (during annealing step S200 described above). The X-ray diffraction patterns in FIG. 2 shows a mixture (having a 0.375:1.0 ratio of Pb to $MnO_2$) heated to 270° C., 350° C., 400° C. and 500° C. The curve showing the X-ray diffraction patterns for the $Pb_xMnO_y$ product after heat treatment at 270° C. and 350° C. show unreacted starting material. The X-ray diffraction patterns for heat treatment at 400° C. and 500° C. demonstrate the presence of the $Pb_xMnO_y$ composition and electrochemically inactive materials, respectively. Based on these X-ray diffraction results, the exemplary process described above results in the formulation of a family of $Pb_xMnO_y$ materials, where x ranges from 0.05 to 0.5, from 0.15 to 0.40, and 0.2 to 0.3 and y ranges from 1.95 to 2.25, from 1.95 to 2.15, and from 1.95 to 2.13.

Figure 3:
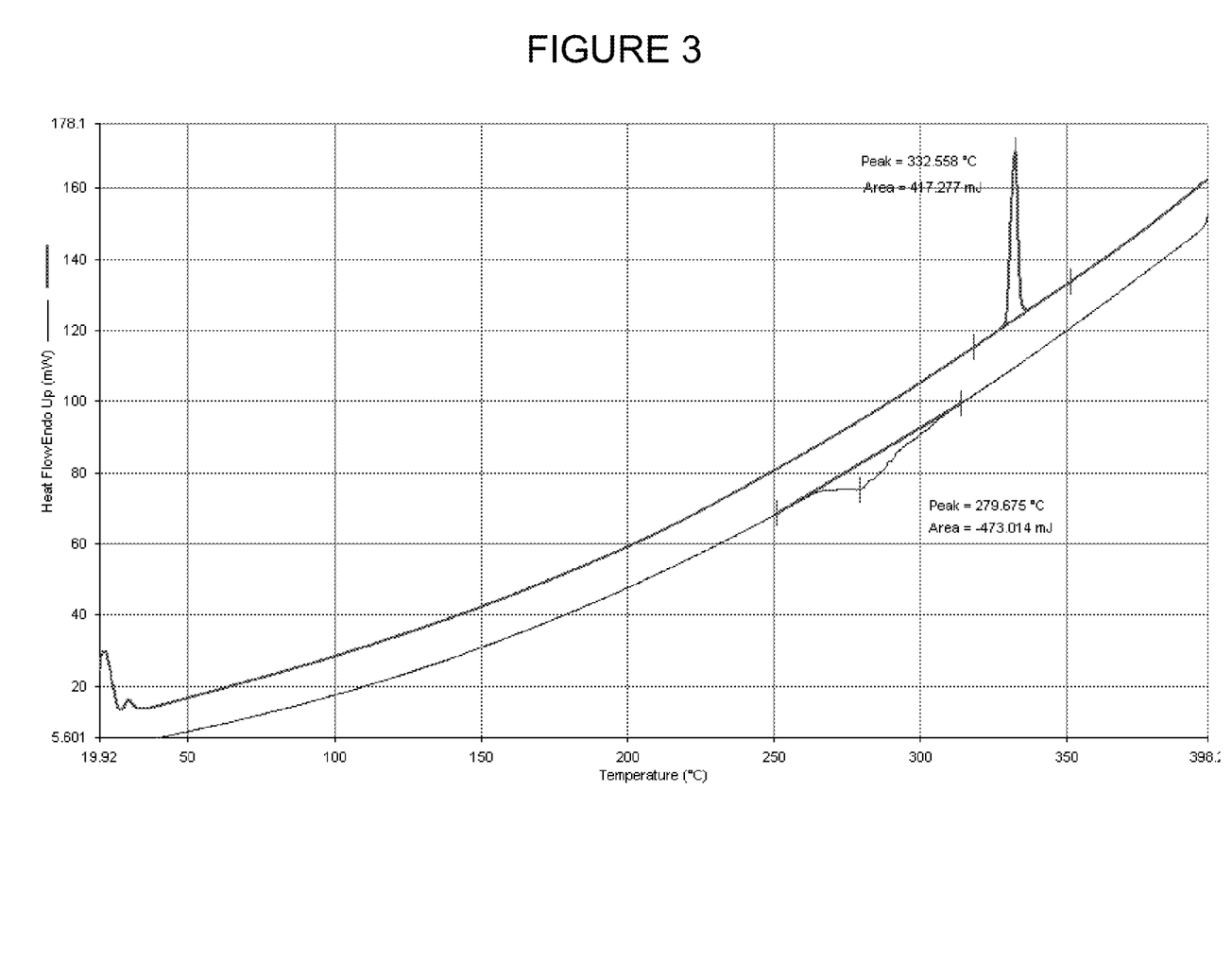
FIG. 3 is a graph showing the results of a differential scanning calorimetry (DSC) scan for $Pb_xMnO_y$ material fabricated according to the present disclosure (at 20° C. per minute to 400° C.).
Figure 4:
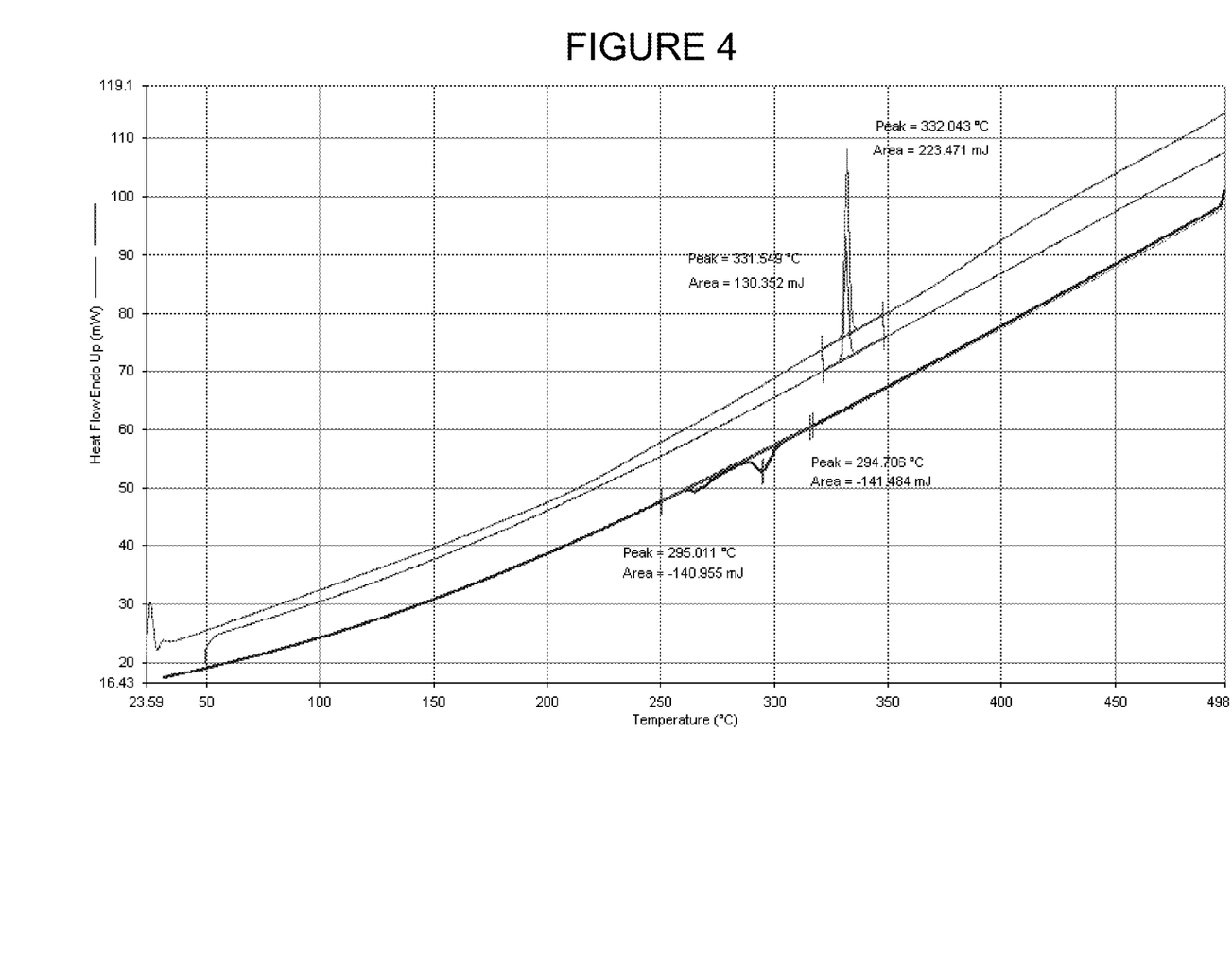
FIG. 4 is a graph showing the results of a differential scanning calorimetry (DSC) scan for $Pb_xMnO_y$ material fabricated according to the present disclosure (at 20° C. per minute to 500° C.).
Figure 5:
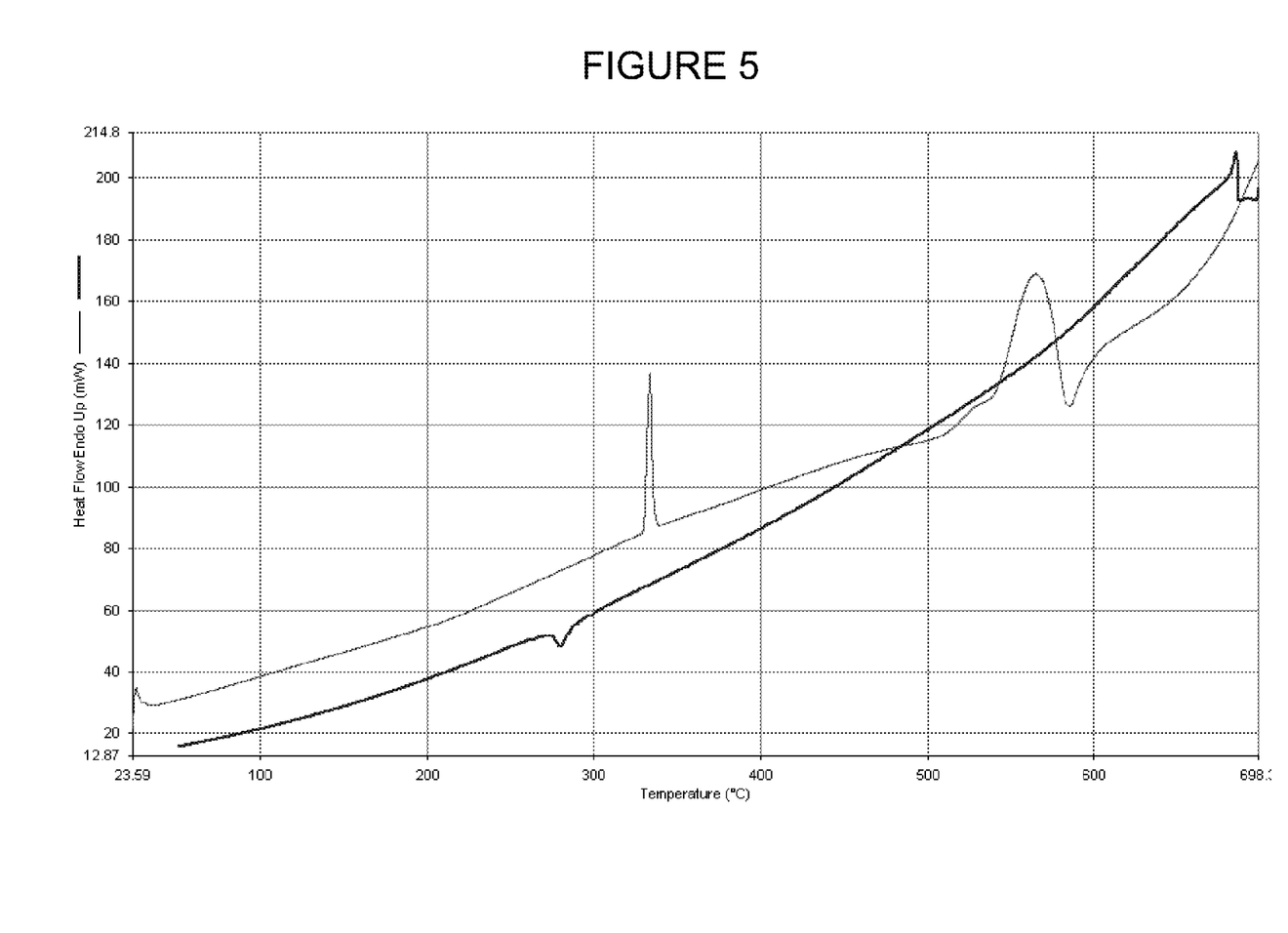
FIG. 5 is a graph showing the results of a differential scanning calorimetry (DSC) scan for $Pb_xMnO_y$ material fabricated according to the present disclosure (at 20° C. per minute to 700° C.).

FIGS. 3 through 5 show DSC scans for a mixture having a 0.375:1.0 ratio of Pb to $MnO_2$. All scans were performed at 20° C. per minute to 400° C., 500° C. and 700° C. FIG. 3 shows the melting of the lead in the mixture during heating followed by refreezing of the lead during cooling. The comparable areas of the peaks indicate minimal reaction between the starting materials. FIG. 4 shows the melting of the lead in the mixture during heating followed by refreezing of the lead during cooling. The difference in the areas of the peaks indicates the reaction between the starting materials. A subtle variation of the slope of the curve initiating at 375° C. also indicates this reaction. FIG. 5 shows an exothermic (thermodynamically favored) reaction within the mixture following the melting of lead. This exothermic reaction initiates at 525° C. and is the decomposition of $MnO_2$. The DSC data indicates the critical temperatures for the reaction of the Pb and $MnO_2$ mixture. The first critical temperature is 325° C., where the lead starting material melts. The second critical temperature is 375° C., where the lead and $MnO_2$ starting materials react. The third critical temperature is 525° C., where $MnO_2$ decomposes yielding an electrochemically inactive material. Although the above sequence of heat treatments achieving the $Pb_xMnO_y$ active material demonstrates the viability of this material, other sequences of $Pb_xMnO_y$ fabrication could be used to optimize the cell performance. Additionally, other metal oxides used for lithium batteries could show improved performance by being reacted with lead.

In order to evaluate the thermodynamic and kinetic properties of the present $Pb_xMnO_y$ active material in a lithium electrochemical system, laboratory liquid electrolyte coin cells were fabricated. Experimental cells may also be fabricated using other methods known in the art, incorporating the present $Pb_xMnO_y$ material described in the present disclosure. The experimental cells were composed of a 0.0974 g lithium anode (with a thickness of 0.0762 cm and a surface area of 2.48 $cm^2$) separated from a Teflon bonded cathode with a nonwoven glass separator. Other suitable anode materials include, but are not limited to, lithium metal, lithium aluminum alloy, lithium silicon alloy, graphite and graphite derivatives, tin oxide, and lithium phosphate. The cathode was fabricated by combining the $Pb_xMnO_y$ material, conductive carbon, and a binder in a 87:9:4 weight percent basis, respectively, in an alcohol base (including but not limited to methanol, ethanol and iso-propanol). Suitable conductive carbon materials include, but are not limited to, conductive carbon black (commercially available from various sources, including Cabot Corporation, under the tradename VULCAN XC72 or VULCAN XC72R), graphite, carbon nanofibers, and carbon nanoparticles (commercially available under the tradename PURE BLACK, manufactured by Superior Graphite Co.). Suitable binders include polytetrafluoroethylene (commercial available under the trade name TEFLON, manufactured by DuPont), polyvinylidene fluoride (PVDF), and latex. The cathode may contain by weight 40%-95% of $Pb_xMnO_y$, 1%-40% of conductive carbon, and 1%-20% binder.

The cathode mix was rolled to 0.04 cm and dried in a vacuum oven. The cathode mass was approximately 0.15 g. The cathode and 0.0762 cm thick lithium foil was cut using a 1.905 diameter (2.48 $cm^2$) hole punch. The cell also included a nickel anode current collector, aluminum cathode current collector, and a 0.01 cm nonwoven glass was used for the separator and as a wick. The electrolyte used was 1 M $LiPF_6$ in proportional mixtures of dimethyl carbonate and ethylene carbonate. Other suitable electrolytes include, but are not limited to, lithium hexafluoroarsenate monohydrate ($LiAsF_6$), lithium perchlorate ($LiClO_4$), lithium tetrafluoroborate ($LiBF_4$), and lithium triflate ($LiCF_3SO_3$).

The cells were cycled with an ARBIN Model BT-2043 Battery Test System. A two step charge profile was used. The charge profile consisted of a constant current charged at 0.5, 1.0, and 2.0 mA (which corresponds to 0.2, 0.4, and 0.8 $mA/cm^2$, respectively). The cut off voltage for discharge ranges from 1.5 to 2.0 volts and the cut off voltage for charge ranges from 4.0 to 4.2 volts. The operating voltage for the $Li/Pb_xMnO_y$ electrochemical couple ranges from 4.25 to 1.5, from 4.2 to 1.75, and from 4.0 to 2.0. The constant voltage was maintained for 5 hours or until the charge current dropped to 0.1 mA. A rest period of 15 minutes between charge and discharge cycles allowed for the cells to equilibrate. Prior to cycling cell impedance was recorded with a Solartron, SI1260 Frequency Response Analyzer with a Solartron, SI1287 Electrochemical Interface using Scribner Associates, Inc., ZPlot and ZView software. The data is used as a quality control tool and for comparative use between variant chemistries.

Figure 6:
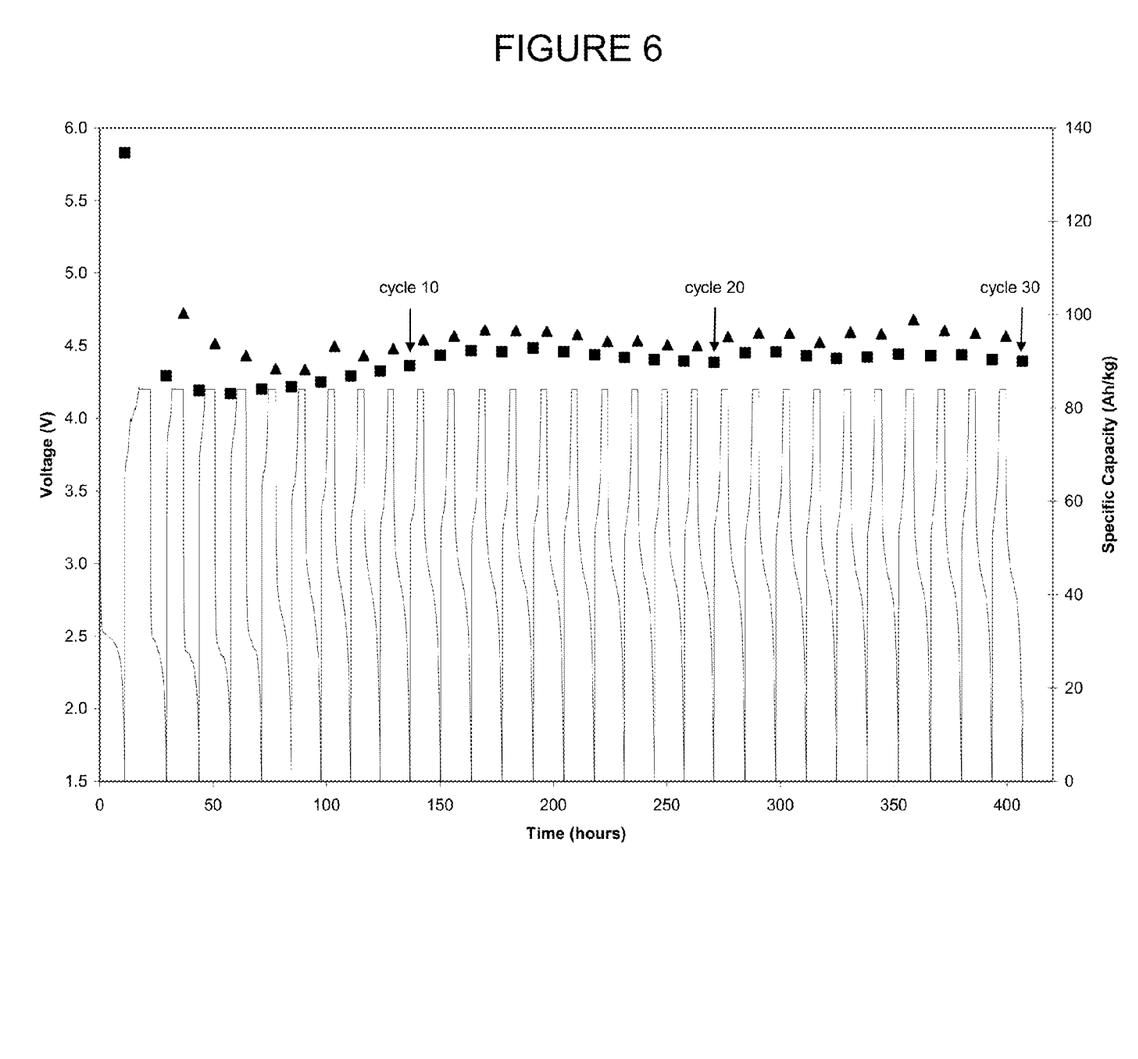
FIG. 6 is a graph illustrating the charge/discharge curves (for 30 cycles) for a $Li/Pb_xMnO_y$ cell according to an exemplary embodiment of the present disclosure.
Figure 7:
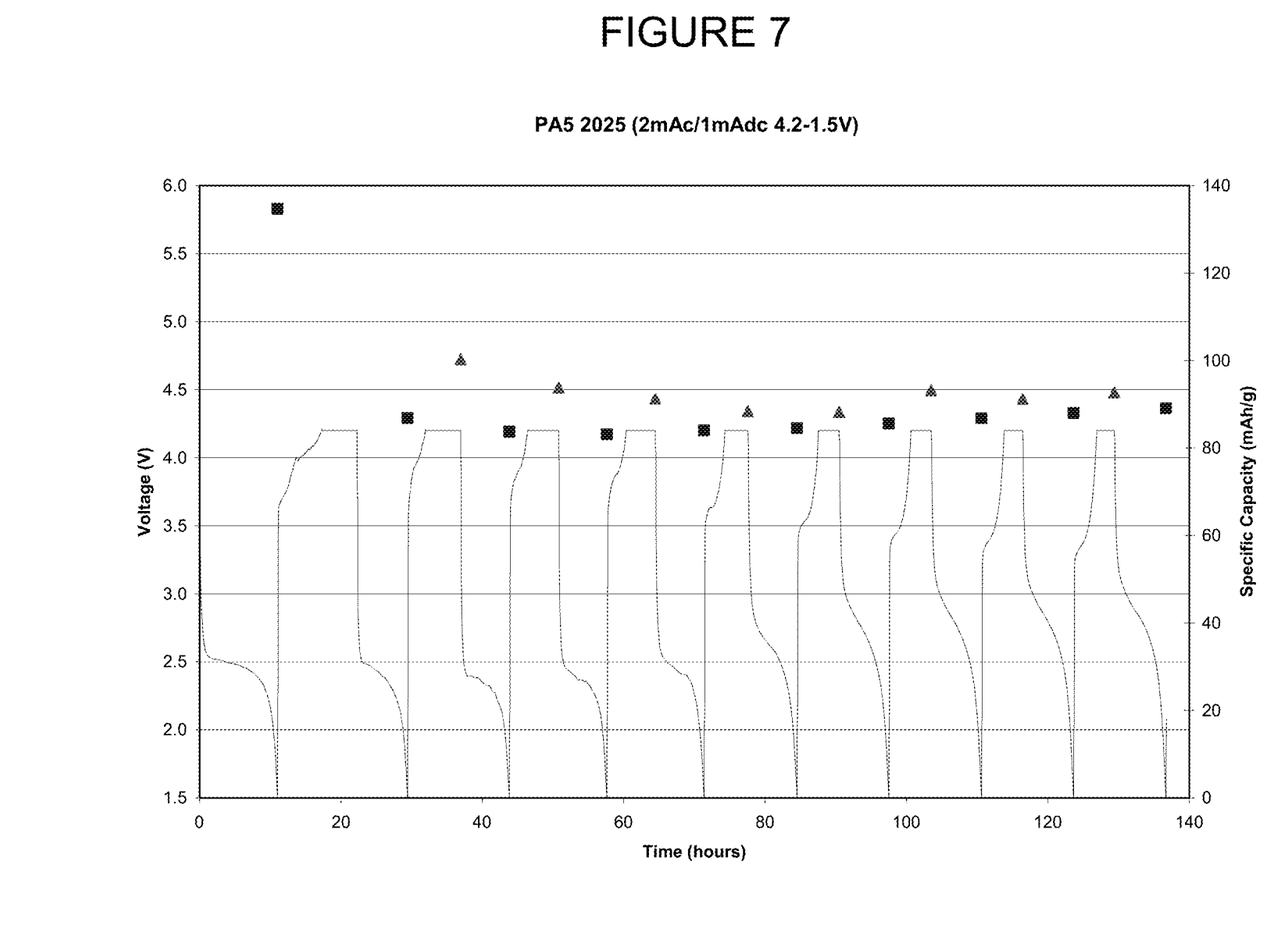
FIG. 7 is a graph illustrating the forming cycles for a $Li/Pb_xMnO_y$ electrochemical couple according to an exemplary embodiment of the present disclosure.
Figure 8:
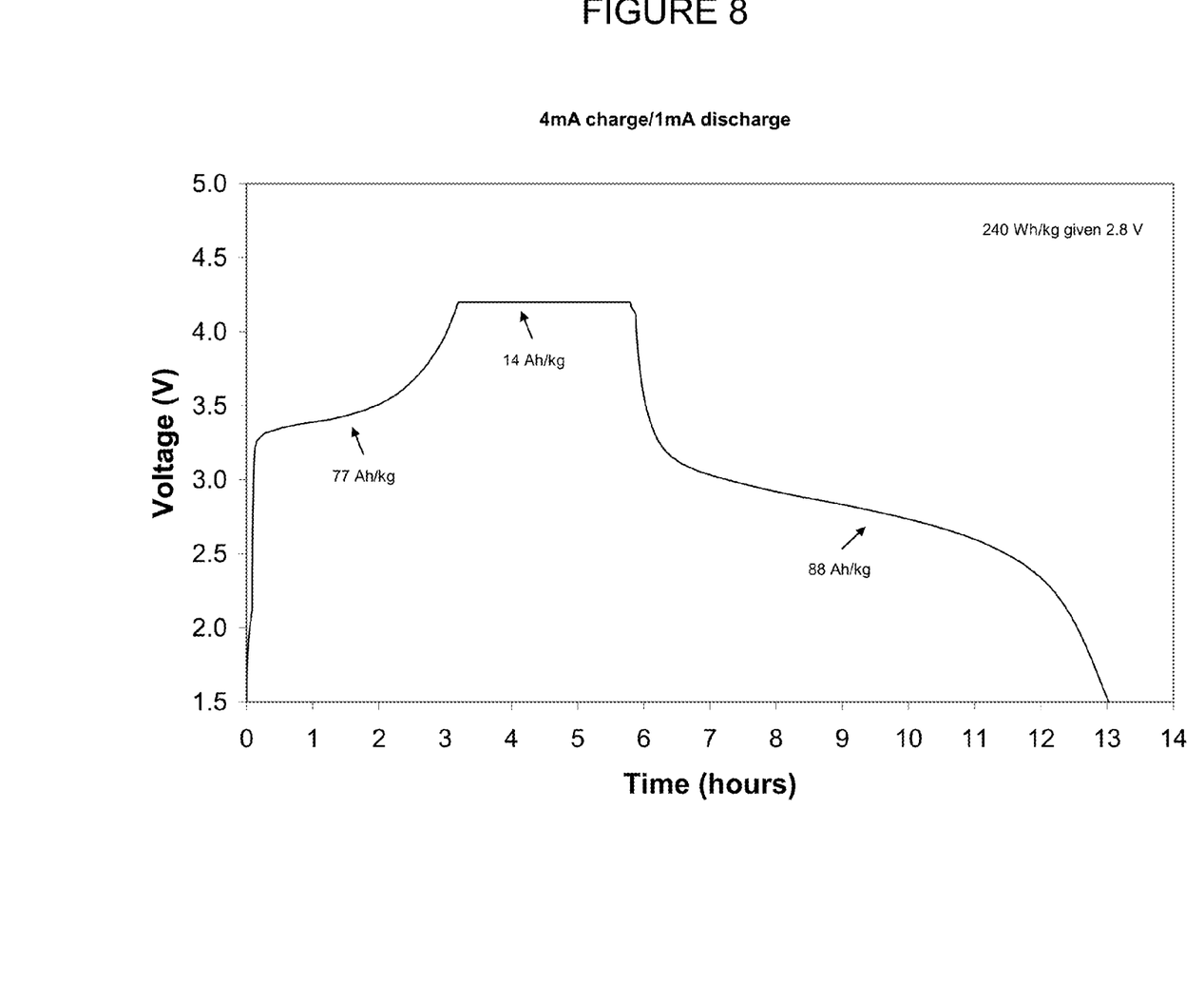
FIG. 8 is a graph illustrating the thirtieth charge/discharge curve for a $Li/Pb_xMnO_y$ cell according to an exemplary embodiment of the present disclosure.

The discharge/charge plots for lithium cells fabricated using exemplary 80:13:7 $Pb_xMnO_y$ cathodes are shown in FIGS. 6 through 8. These lithium cells are exemplary embodiment of the presently disclosed $Li/Pb_xMnO_y$ electrochemical couple. FIGS. 6 through 8 show data for cells fabricated having a 0.24:1.0 ratio of Pb to $MnO_2$ (CMD) mixture heated to 400° C. for 24 Hrs. FIG. 6 shows the cycling data for 30 cycles for the $Li/Pb_xMnO_y$ electrochemical couple, and demonstrates the stability and lack of capacity fading of the present $Li/Pb_xMnO_y$ electrochemical couple. FIG. 7 shows that the forming cycle for the $Li/Pb_xMnO_y$ electrochemical couple, which is complete within 6 cycles and is representative of the present lead manganese-based cathode material. FIG. 8 shows the 30th charge/discharge cycle of an exemplary $Li/Pb_xMnO_y$ electrochemical cell. Based on the data in FIGS. 6 through 8, the method provided in the present disclosure produces a lead manganese-based cathode material having differential capacity characteristics comparable to conventional lithium manganese-based cathode materials fabricated using conventional methods.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

The invention claimed is:

1. A method of preparing a lead manganese-based cathode material via a solid state reaction, the method comprising:
   mixing via a solid mixing method a lead compound in a solid state and a manganese compound in a solid state to produce a homogenous solid mixture;
   annealing the homogenous solid mixture for a time period ranging from 16 to 24 hours at a temperature ranging from 400° C. to 500° C.;
   and mixing the annealed homogenous solid mixture with a conductive carbon and a binder,
   wherein the lead compound is a compound selected from a group consisting of lead metal, lead hydroxide, and lead carbonate, and
   wherein the manganese compound is a compound selected from a group consisting of $MnO_2$, $Mn_3O_4$, manganese nitrate, manganese carbonate, and manganese hydroxide.

2. The method according to claim 1, wherein the conductive carbon is a compound selected from a group consisting of carbon black, graphite, carbon nanofibers, and carbon nanoparticles.

3. The method according to claim 1, wherein the binder is a compound selected from the group consisting of polytetrafluoroethylene, polyvinylidene fluoride, and latex.

4. The method according to claim 1, wherein the lead manganese-based cathode material has a general formula of $Pb_xMnO_y$, where x ranges from 0.05 to 0.5 and y ranges from 1.95 to 2.25.

5. The method according to claim 1, wherein the solid mixing method is selected from a group consisting of ball milling, high amplitude vibration milling, and mortar and pestle mixing.

* * * * *